May 3, 1927.

G. I. BARBOUR

LAVATORY

Filed Dec. 2, 1926

INVENTOR.

Garland I. Barbour,

BY Geo. P. Kimmel ATTORNEY.

May 3, 1927.

G. I. BARBOUR

LAVATORY

Filed Dec. 2, 1926

INVENTOR.
Garland I. Barbour;
BY
Geo. P. Kimmel, ATTORNEY.

Patented May 3, 1927.

UNITED STATES PATENT OFFICE.

GARLAND I. BARBOUR, OF AKRON, OHIO.

LAVATORY.

Application filed December 2, 1926. Serial No. 152,207.

This invention relates to a lavatory, designed primarily as a part of an automobile, but it is to be understood that a lavatory, in accordance with this invention can be set up in connection with any type of vehicle for which it is found applicable, such as railway passenger cars, Pullman cars, motor busses, interurban street cars, street railway cars, and has for its object to provide, in a manner as hereinafter set forth, a lavatory including a bowl and a normally closed tank for receiving and storing excrement discharged from the bowl, under such conditions providing for the storage of the excrement until the vehicle reaches a place desired to flush out or discharge the excrement from the storage tank, and further by such arrangement the driver of the vehicle will avoid all danger of violating ordinances of municipalities through which the vehicle is driven.

A further object of the invention is to provide, in a manner as hereinafter set forth, a lavatory including a closet bowl and an excrement storage tank and arranged relatively to each other and normally closed to each other, and further with the lavatory including means operated by a person entering the same for respectively establishing and closing communication between the bowl and tank.

A further object of the invention is to provide, in a manner as hereinafter set forth, a lavatory including an excrement storage tank and which is normally closed to prevent the discharge of the excrement therefrom until it is desired, and further to provide the tank with means to permit of the flushing thereof or for the discharge of the excrement therefrom when occasion requires.

Further objects of the invention are to provide, in a manner as hereinafter set forth, a lavatory including a normally closed excrement storage tank and designed primarily for use in connection with vehicles, capable of being used while the vehicle is standing still or in motion and when used constructed and arranged to prevent the discharge of the excrement on the roadway or street, and to further set up a lavatory which is comparatively simple in its construction and arrangement, strong, durable, compact, readily installed with respect to a vehicle, more particularly an automobile, thoroughly efficient in its use, and comparatively inexpensive to manufacture.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views.

Figure 1:
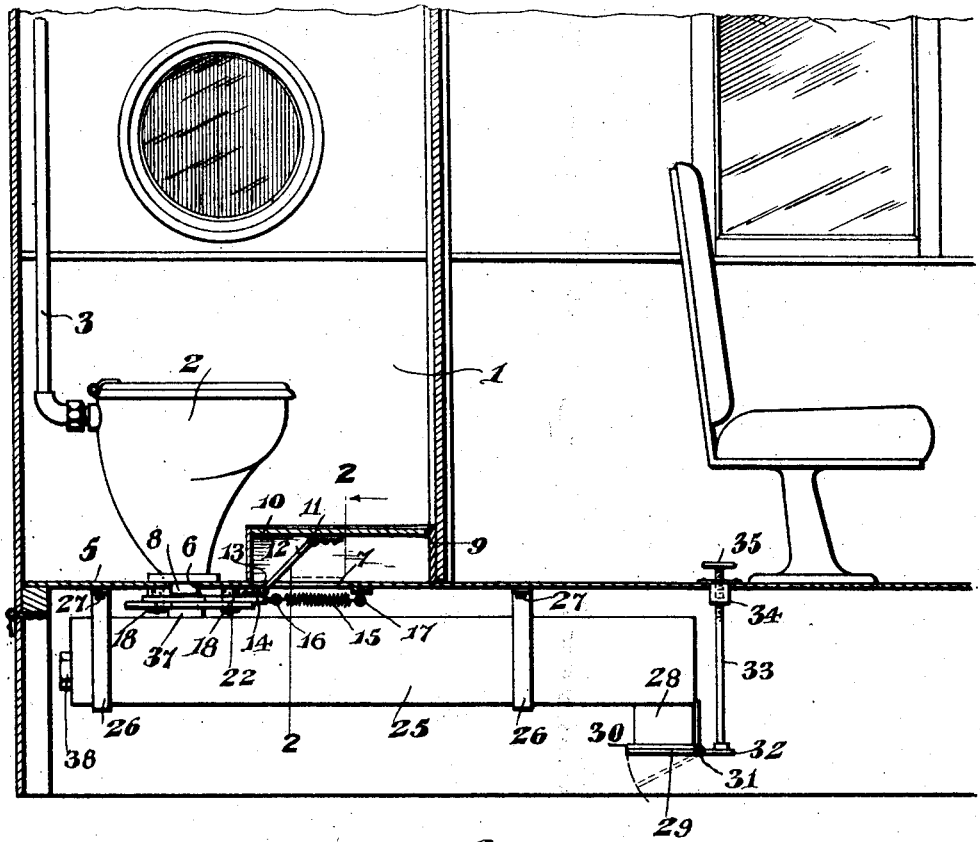
Figure 1 is a fragmentary view, in sectional elevation, showing the adaptation of a lavatory, in accordance with this invention, with respect to a motor coach.
Figure 2:
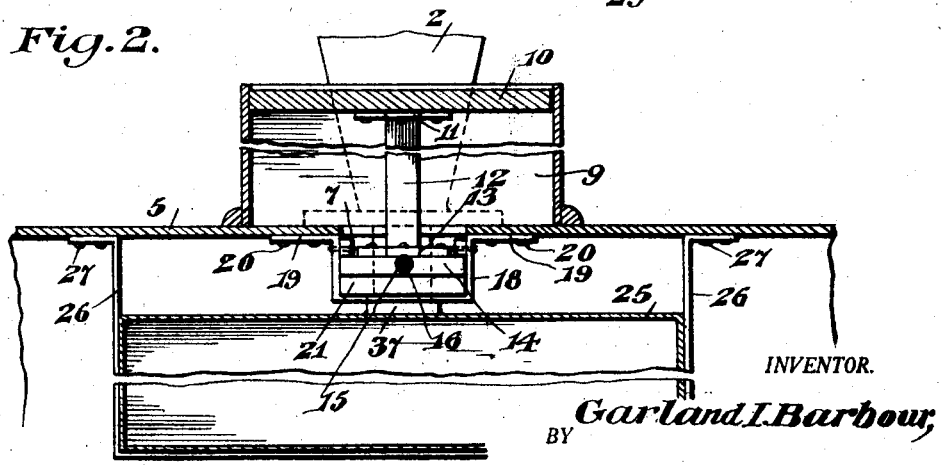
Figure 2 is a section on line 2—2 Figure 1.
Figure 3:
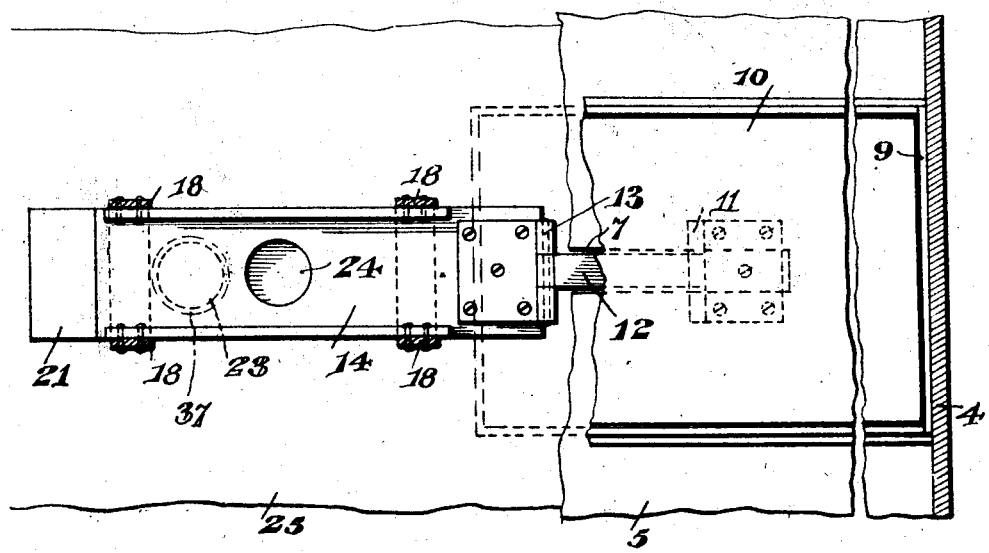
Figure 3 is a fragmentary view, in plan illustrating the valve slide for normally closing the excrement storage tank and the actuating mechanism for said valve slide and which is taken on line 3—3 Figure 4.
Figure 4:
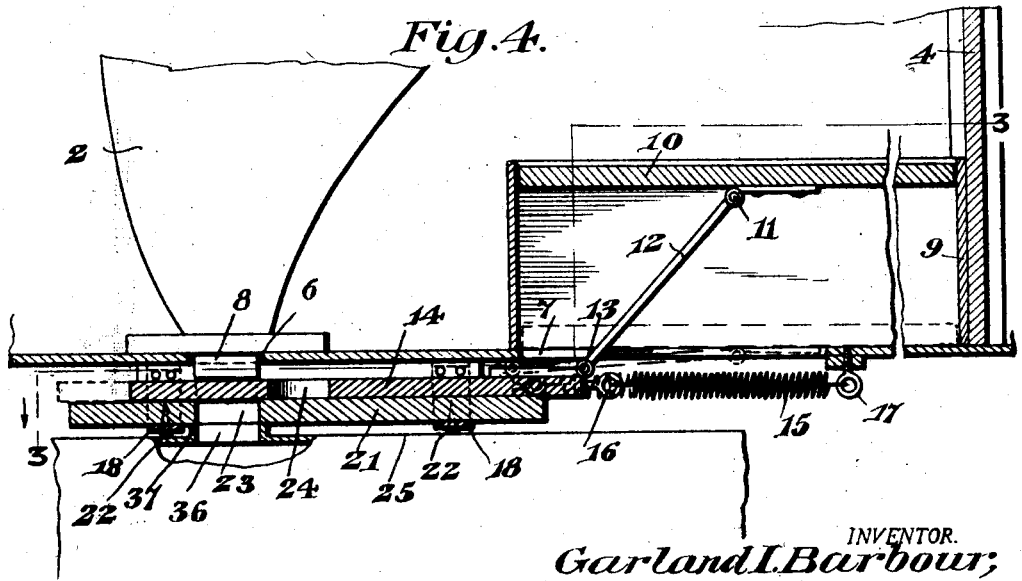
Figure 4 is a longitudinal sectional view of the valve slide and its operating mechanism.

The lavatory preferably of a size three feet by three feet, will be located in the rear of the automobile or coach. The lavatory chamber is indicated at 1 and has arranged therein a closet bowl 2, and communicating with the latter is a vertically disposed flushing pipe 3 which leads from a water storage tank not shown. The chamber 1 is provided with a door 4 for normally closing the same. The floor of the chamber 1 is indicated at 5 and is provided with an opening 6, and a slot 7 of appropriate length and width and which is arranged forwardly with respect to the opening 6. The lower or outlet end of the bowl 2 is indicated at 8 and which extends downwardly through the opening 6.

Secured to the floor 5 and arranged forwardly with respect to the bowl 2, is a vertically disposed guide member 9 of appropriate height. Arranged within the member 9 is a vertically movable, spring controlled platform 10. Hinged to the lower face of the platform 10, as at 11, is the upper end of a slide valve shifting bar 12, which is pivotally connected as at 13, to the forward end of a spring controlled slide valve 14. The controlling spring for the slide valve 14 is indicated at 15 and which also provides a controlling spring for the platform 10. The forward end of the slide valve 14 is provided with an eye 16, to which is connected the rear end of the spring 15. Depending from the floor 5, forwardly with respect to the slot 7 is an eye 17, to which is connected the forward end of the spring 15. The actuating or shifting bar 12, for the slide valve 14 extends down through the slot 7.

Secured to the floor 5, and depending therefrom, is a pair of yoke-shaped supports 18, arranged in spaced relation and each of which is formed at its top with a pair of oppositely disposed right angularly extending flanges 19, which is secured against the lower face of the floor 5, by the holdfast devices 20. The supports 18 are termed hangers and carry a stationary support 21, upon which the valve 14 reciprocates. The stationary support 21 is secured to the hangers 18, by the holdfast devices 22. The support 21 extends through the hangers 18 and is of greater length than the distance between said hangers and further projects from each of these latter. The support 21 between its transverse median and rear end is formed with an opening 23. The slide valve 14 between its transverse median and rear end is formed with an opening 24. The openings 23 and 24 are normally out of register with each other and which is provided for by the controlling spring 15. When the platform 10 is depressed, the slide valve 14 is shifted rearwardly to an extent whereby the opening 24 will register with the opening 23. When the opening 24 is in registration with the opening 23, it registers with the discharge end 6 of the bowl 2. The slide valve 14 normally closes the lower end of the bowl 2. The platform is depressed by a person entering the chamber 1, whereby communication will be established between the bowl 2, opening 24 and opening 23 and such communication will be maintained, as long as the platform 10 is depressed. When pressure is relieved from platform 10, the spring 15 will act to shift the slide valve 14 forwardly, whereby communication will be cut off between the bowl 2 and the opening 23.

Arranged below the floor 5, is an excrement storage tank 25, which is supported by a pair of spaced depending hangers 26, and these latter are secured to the floor 5 by the holdfast devices 27. The storage tank 25 is of a size that will lose a capacity somewhat greater than the water storage tank. The tank 25 at its forward end has a discharge spout 28, which is normally closed by a hinged valve 29, the latter having its upper face provided with a heavy gasket 30, which acts as a means to prevent any leakage of refuse from the tank to the roadway or highway. The valve 29 and gasket 30 are of a greater size than the lower end of the spout 28. The valve 29 is hinged as at 31 with the spout 28, and is provided with an arm 32, to which is connected a vertically disposed shifting rod 33, the latter extending through and having threaded connection with a depending sleeve 34, which is secured to the floor 5. The rod 33 extends up through the floor 5 and is provided with a hand wheel 35 for the purpose of revolving it to cause the rod 35 to move vertically so that the valve 29 can be shifted to open position or moved to closure position in a manner whereby the gasket 30 will tightly bind against the discharge end of the spout 28 and prevent leakage. The tank 25 at its top is formed with an inlet opening 36, surrounded by a vertically extending collar 37, having its inner face register with the wall of the opening 23, whereby when the openings 23 and 24 are in registration, excrement can pass from the bowl 2 and be discharged into the storage tank 25.

The rear end of the tank 25 is formed with a suitable hand hole 38 for clean-out and flushing purposes. The storage tank is to be discharged at the end of the automobile or coach run.

After a person has left the chamber 1, and pressure relieved from the platform 10, the inlet opening 36 of the tank 25 is closed and which prevents obnoxious odors from accumulating in the chamber 1. Before rising from the bowl the person will flush the same, thereby cleaning it while the valve is still open.

It is thought the many advantages of a lavatory, in accordance with this invention, can be readily understood, and although the preferred embodiment of the invention is as illustrated and described, yet it is to be understood that changes in the details of construction can be had which will fall within the scope of the claim hereunto appended.

What I claim is:

A lavatory for a travelling vehicle comprising an excrement storage tank adapted to be suspended from the bottom of the vehicle and having a normally closed inlet and a normally closed discharge opening, a shiftable, spring controlled apertured slide valve arranged over said inlet for normally closing it, a vertically movable, pressure operated, spring controlled platform connected with said valve for shifting it to open said inlet, when the platform is depressed, for the passage of excrement to the tank, and a controlling spring common to said slide valve and platform.

In testimony whereof, I affix my signature hereto.

GARLAND I. BARBOUR.